Figure 1:
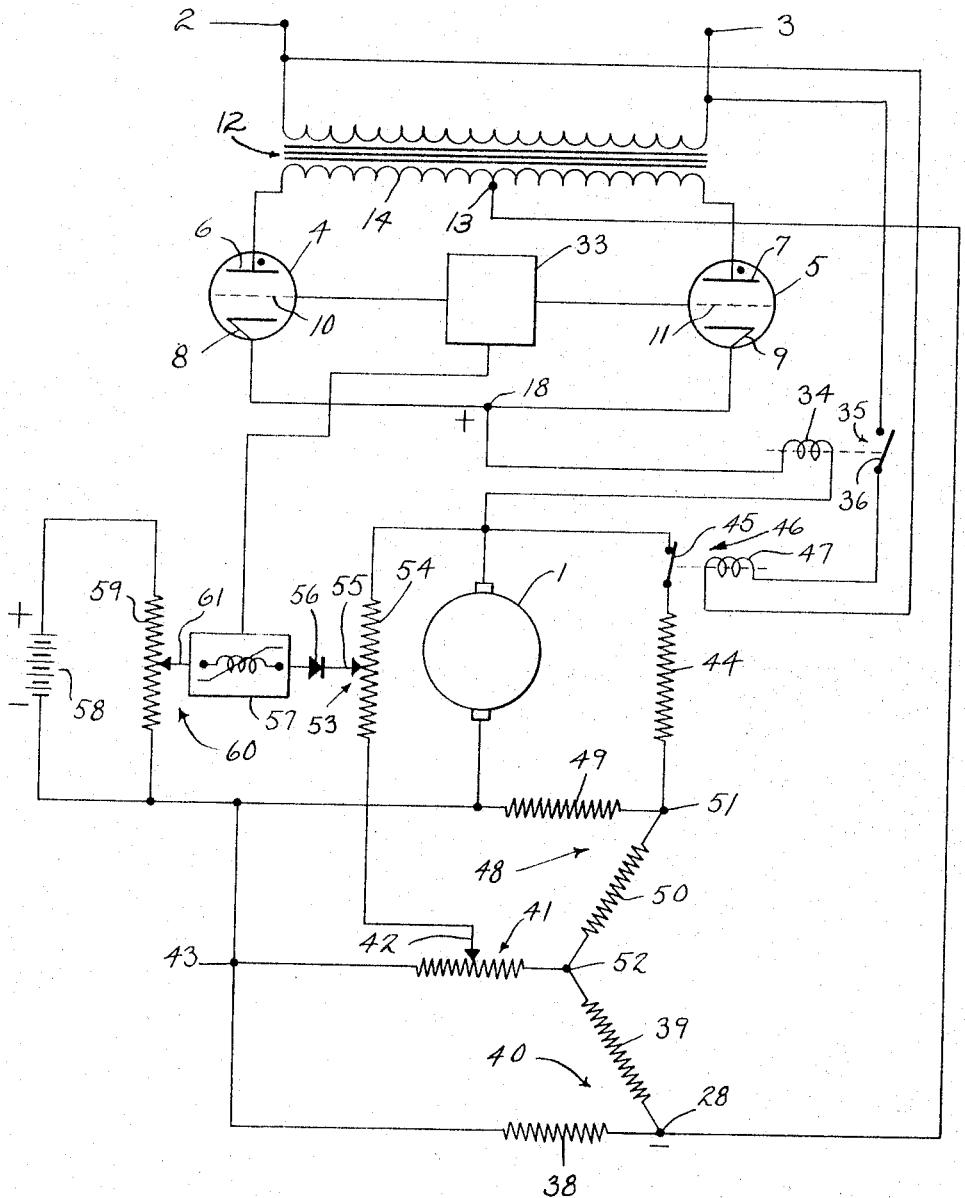

INVENTORS
DAVID E. FORD, JR.
WILLIAM J. HUDSON

ATTORNEY

May 16, 1967 D. E. FORD, JR., ET AL 3,320,507
IR COMPENSATION FOR DIRECT CURRENT MOTOR CONTROL
Filed June 15, 1964 2 Sheets-Sheet 2
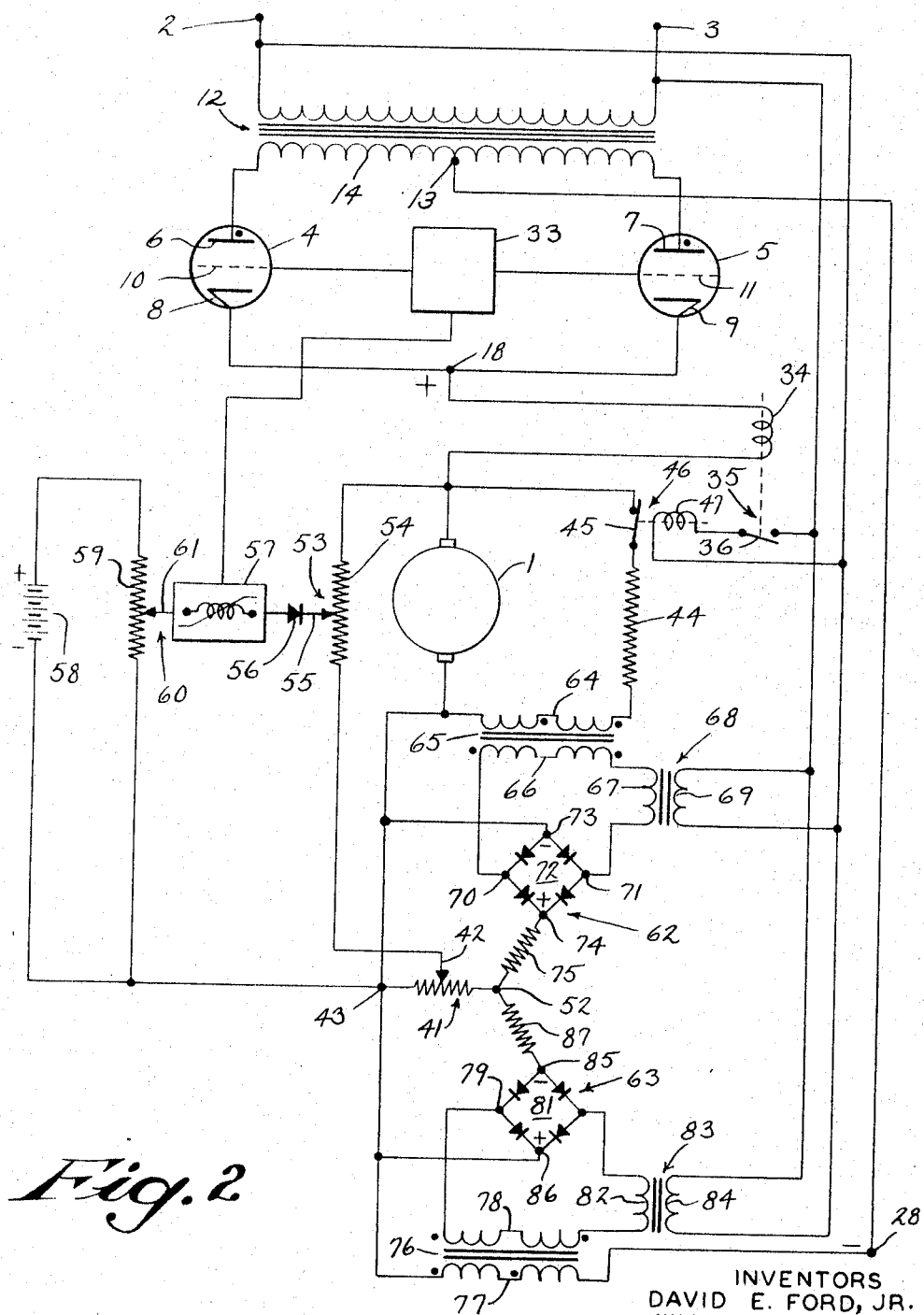
Fig. 2
INVENTORS
DAVID E. FORD, JR.
WILLIAM J. HUDSON
BY 
ATTORNEY

United States Patent Office 3,320,507
Patented May 16, 1967

3,320,507
IR COMPENSATION FOR DIRECT CURRENT MOTOR CONTROL
David E. Ford, Jr., and William J. Hudson, Milwaukee, Wis., assignors to Allen-Bradley Company, Milwaukee, Wis., a corporation of Wisconsin
Filed June 15, 1964, Ser. No. 375,032
10 Claims. (Cl. 318—269)

The present invention relates to a deceleration control for a dynamo driven by a controllable power supply, the output of which is controlled by an armature voltage feedback speed control; and more particularly the present invention resides in a dynamic braking circuit adapted for connection across a dynamo during deceleration, an IR compensation impedance, a feedback source for connection from said IR compensation impedance across said dynamo; and a transducer connected to sense a braking current in said dynamic braking circuit and to impose a signal across said IR compensation impedance proportional to said braking current.

The present invention permits the utilization of armature voltage feedback motor speed controls in conjunction with dynamic braking in a much broader range of applications and with greater efficiency in production and distribution than ever before. The prevalence of nonregenerative power supplies such as thyratron converters for driving direct current motors resulted in the common use of dynamic braking circuits for deceleration of the motors. However, these practices also created an acute problem in the use of armature voltage feedback speed controls for such motors, since those controls rely on the principle that the back E.M.F. generated in a motor and appearing across the armature is always directly proportional to motor speed.

The problem arises from the fact that a voltage drop measured across an armature of an operating dynamo, whether it be a motor or a generator, represents not only the E.M.F. generated in the armature, but also the IR loss in the armature. More specifically, the potential difference measured across an armature of a dynamo operating as a generator—and this, of course, includes a decelerating motor—equals the difference between the generated E.M.F. and the IR loss in the dynamo. On the other hand, the potential difference measured across a dynamo operating as a motor equals the sum of the generated E.M.F.—referred to in a motor context as the back E.M.F.—and the IR loss in the armature. Hence, a feedback voltage signal taken across an armature would reflect an apparent armature speed higher than the actual speed during motoring and lower than the actual speed during braking. As a result, the accuracy of the speed control system is greatly reduced, and the entire system may be caused to hunt excessively or even be thrown into oscillation at each speed change. This problem was solved in theory by inserting an IR compensation potentiometer in series with the motor armature so that armature current would flow through its resistance element during both braking and motoring, and then a feedback signal is taken from the sliding contact of the potentiometer, as is taught in U.S. Patent No. 2,721,968.

The solution of the prior art, however, proved to be limited in practice. For example, in many applications the resistance in the dynamic braking circuit must be held to a minimum to achieve maximum braking force on the motor, since the braking force varies directly with the magnitude of the braking current and inversely with the magnitude of the resistance in the dynamic braking circuit. Therefore, in an application where the IR compensation resistance must be greater than the permissible resistance in the dynamic braking circuit, the solution of the prior art is not applicable and a different type of motor speed control is required. Also, the solution of the prior art does not lend itself well to efficient production and distribution, since the varying operational characteristics of direct current motors and the requirements of their applications necessitates individual design and assembly of each such speed control.

The present invention achieves a practical armature voltage feedback motor speed control with dynamic braking, since a speed control embodying the present invention is not limited in its application by the magnitude of the IR compensation resistance and it may be factory made with interchangeable parts for field assembly in most applications. The circuitry of a speed control embodying the present invention senses the flow of armature current and imposes a signal proportional to that armature current across an IR compensation resistor from which is taken the feedback signal. Thus, the IR compensation resistance may be entirely removed from the armature current circuit. Due to the fact that the value of the IR compensation resistance is proportional to the actual IR loss in the motor, the compensated feedback signal will be proportional to the E.M.F. generated in the rotating armature, and therefore to the speed of the motor. But since the IR compensation resistor is removed from the main armature current circuit, it cannot limit the minimum resistance of the dynamic braking circuit and therefore it cannot be a limiting factor in the use of armature feedback speed controls. While the parameters of a circuit of the present invention maintains a certain proportionality, the absolute specifications of the circuit elements need only be generally compatible with the system in which they are used. Therefore, it is possible to manufacture interchangeable components such that by proper selection the control may be applied to any system in the field.

Accordingly, it is an object of the present invention to provide a highly accurate deceleration control for a direct current motor utilizing dynamic braking impedance and armature voltage feedback control.

It is another object of the present invention to provide a versatile deceleration control for application to direct current motor installations within a very broad range of desired operating specifications.

It is another object of the present invention to provide deceleration control for a direct current motor powered by a nonregenerative source and controlled by armature voltage feedback control, which deceleration control is capable of rapidly decelerating the motor to a predetermined speed.

It is another object of the present invention to provide an accurate dynamic braking deceleration control capable of providing maximum braking.

It is another object of the present invention to provide a deceleration control utilizing IR compensation impedance for an armature voltage feedback controlled direct current motor, wherein the IR compensation impedance is not in the main armature current circuit.

It is another object of the present invention to provide a deceleration control for a direct current motor which control may be readily adapted for installation in a broad range of speed control systems varying in operating specifications.

The foregoing and other objects will appear in the description to follow. In the description, reference is made to the accompanying drawings which form a part hereof and in which there is shown by way of illustration several specific embodiments in which this invention may be practiced. These embodiments will be described in sufficient detail to enable those skilled in the art to practice this invention, but it is to be understood that other embodiments of the invention may be used and that structural changes may be made in the embodiments described without departing from the scope of the invention. Consequently, the following detailed description is not to be taken in a limiting sense; instead, the scope of the present invention is best defined by the appended claims.

In the drawings:

FIG. 1 is a schematic diagram of a preferred embodiment of the present invention, and FIG. 2 is a schematic diagram of a second preferred embodiment of the present invention.

Referring now specifically to the drawings, an armature 1 representing a direct current motor, the other elements of which have been omitted for the sake of clarity of illustration, is connected to be energized by a thyratron type of controlled rectifier for rectifying A.C. power, representing one form of a nonregenerative controllable power supply. The power supply or converter has a pair of input terminals 2 and 3 for connection to an A.C. line, and these are connected through a power transformer 12 to anodes 6 and 7 respectively of a pair of thyratrons 4 and 5. The thyratrons 4 and 5 have their cathodes 8 and 9 connected in common to a positive output terminal 18 of the power supply, which has a negative output terminal 28 connected to a center tap 13 on the secondary 14 of the above mentioned power transformer 12. Control elements, or grids, 10 and 11 respectively of the thyratrons 4 and 5, are connected to receive control signals from a conventional control signal source 33, which control signals determine the firing angle of the thyratrons 4 and 5, and thereby control the magnitude of the output of the power supply delivered to the output terminals 18 and 28.

Power to drive the motor is conducted to the motor by means of a motoring circuit which connects the armature 1 across the output terminals 18 and 28 of the power supply. The positive output terminal 18 is connected to one side of the armature 1 through a coil 34 of an underload relay 35, which has normally open contacts 36. The negative output terminal 28 of the power supply is connected to a drop resistor 38 and to a current limiting resistor 39, which, combined, make up a motoring transducer 40. The opposite ends of the drop resistor 38 and the current limiting resistor 39 are connected to the opposite ends of an IR compensation impedance consisting of a potentiometer 41 which has a sliding contact 42, thus placing the drop resistor 38 and the current limiting resistor 39 in series across the IR compensation potentiometer 41. A reference junction 43 joining the end of the drop resistor 38 to the end of the IR compensation impedance 41 is also connected to the side of armature 1 opposite from that connected to the positive output terminal 18, thereby completing the motor drive circuit. The reference junction 43 will always be at the base or reference potential for the control system so that motor speed will be represented by a potential level above that of the junction 43.

A dynamic braking circuit is also connected across the armature 1, and it includes a dynamic braking resistor 44 connected to one side of the armature 1 in series with a current valve in the form of normally closed contacts 45 of a slow down relay 46, which has its coil 47 connected across the alternating current input terminals 2 and 3 to the power supply through the normally open contacts 36 of the underload relay 35. The other end of the braking resistor 44 is connected to the other side of the armature 1 through a drop resistor 49 of a braking transducer 48. In addition to the drop resistor 49 the braking transducer 48 also contains a current limiting resistor 50, one end of which is connected in common with adjacent ends of the drop resistor 49 and the dynamic braking resistor 44 at a junction 51, and the other end of which is connected in common with ends of the IR compensation potentiometer 41 and the motoring transducer current limiting resistor 39 at a compensation junction 52. The potential level of the compensation junction 52 will fluctuate relative to the reference junction 43. During motoring the compensation junction 52 will be at a lower potential, or more negative, than the reference junction 43 and during braking it will be at a higher, or more positive potential than the reference junction 43, so that appropriate compensation for armature IR losses will result.

A feedback signal source is provided in a feedback potentiometer 53 which has one side of its resistance element 54 connected to the slider 42 on the IR compensation potentiometer 41 and the other end of its resistance element 54 connected to the side of the armature 1, which is adjacent the positive output terminal 18 of the power supply and which is opposite from that connected to the reference point or junction 43. A sliding contact 55 of the feedback potentiometer 53 is connected through a blocking diode 56 to an error detector 57, which is a well known type utilizing a magnetic amplifier. The error detector 57 is connected so that its output signal, the error signal, will be transmitted to the control signal source 33. A reference signal source, represented in the drawing by the symbol for a battery 58, is connected across a resistance element 59 of a speed control potentiometer 60, which has a sliding contact 61 connected to the error detector 57. The reference signal source 58 has its negative pole connected in common with the lower end of the resistance element 59 of the speed control potentiometer 60 to the reference junction 43. The error detector 57 will detect a difference in potential level, relative to the reference junction 43, between the sliding contact 55 on the feedback potentiometer 53 and the sliding contact 61 on the speed control potentiometer 60, and it will transmit an error signal representing that difference to the control signal source 33, causing it to emit a corresponding control signal to the grids 10 and 11 of the thyratrons 4 and 5.

The disclosure of the operation of a circuit embodying the present invention does not require a detailed discussion of the functioning of the thyratron converter shown in the drawings, since it is not a part of the present invention, and it is a conventional rectifier well known to the art. Suffice it to say that the embodiment of the invention shown here utilizes a nonregenerative, controllable power supply in the form of a thyratron converter for rectifying alternating current power, and that the output of the power supply at its output terminals 18 and 28 is controlled by the control signals fed to the grids 10 and 11 of its thyratrons 4 and 5.

During acceleration and normal motor operation, motoring current flows from the positive output terminal 18 of the controllable power supply through the coil 34 of the underload relay 35, energizing that relay to hold its normally open contact 36 closed. With the underload relay contacts 36 closed, braking relay 46 is energized opening its normally closed contacts 45, to disconnect the braking circuit. Motoring current will then pass through the armature 1, and the drop resistor 38 in the motor transducer 40 to the negative output terminal 28 of the power supply. The potential drop across the drop resistor 38 will impose a motoring signal proportional to the current flowing through the armature 1 across the IR compensation potentiometer 41, such that the reference junction 43 will be at a higher or more positive potential than the compensation junction 52.

Since the reference junction 43 is at a higher potential level than the compensation junction 52, the slider 42 on the IR compensation potentiometer 41 is also at a higher potential than the compensation junction 52. Therefore, a current passing through the feedback potentiometer 53 to the sliding contact 42 on the IR compensation potentiometer 41, will flow to the compensation junction 52, and through the current limiting resistor 39 to the negative output terminal 28 of the power supply. Also, current flow through the IR compensation potentiometer is from the reference junction 43 to the compensation junction 52, and these currents will have the effect of reducing the potential level of the sliding contact 55 on the feedback potentiometer 53 relative to the reference points 43.

The sliding contact 42 on the IR compensation resistor 41 will be set so that the potential difference between the sliding contact 42 and the reference junction 43 is proportional to the IR drop in the armature 1, and the reduction in the potential level of the sliding contact 55 relative to the reference junction 43 will be proportional to the IR loss in the armature 1. Hence, the total potential drop from the slider 55 of the feedback potentiometer 53 to the reference point 43, as seen by the error detector 57, will accurately reflect the E.M.F. generated in the armature 1, which in a motoring context is commonly called back E.M.F. As a result, the potential level of the sliding contact 55 on the feedback potentiometer 53 as seen by the error detector 57 during motoring operation of the direct current motor will serve as an accurate measure of the actual speed of the motor. In setting the sliding contact 42 its position is dependent upon the ratio of the resistance between the sliding contact 55 and the lower end of the resistance element 54 to the entire resistance of the resistance element 54. If this ratio be designated K, then the setting should have the voltage between point 43 and sliding contact 42 be equal to $$\frac{K}{1-K}IR$$

If an operator of the motor wishes to accelerate the motor to a higher speed, he will manipulate his speed control to move the sliding contact 61 upward on the resistance element 59 of the speed control potentiometer 60. Since the sliding contact 61 on the speed control potentiometer 60 will then be at a higher potential level than the sliding contact 55 on the feedback potentiometer 53, current will tend to flow from the speed control potentiometer 60 to the feedback potentiometer 53 through the diode 56. The error detector 57 will translate that current into a command to the control signal source 33, which in turn will cause the thyratrons 4 and 5 to deliver more power to the output terminals 18 and 28. As the motor increases in speed, the back E.M.F. generated in the armature 1 will also increase, with the result that the potential level of the sliding contact 55 on the feedback potentiometer 53 increases with the speed of the motor. When the motor speed has reached a desired level, the potential level of the sliding contact 61 on the speed control potentiometer 60 and the sliding contact 55 on the feedback potentiometer 53 relative to the reference junction 43 will have returned to the constant speed operating relationship, and the error signal from the error detector 57 to the control signal source 33 will have been restored to normal so as to indicate that acceleration of the motor should be stopped and the new speed maintained.

When the motor operator chooses to decelerate the motor, he will manipulate his speed controls so that the sliding contact 61 on the reference potentiometer 60 is moved downward, decreasing the potential difference between the sliding contact 61 on the reference potentiometer 60 and the reference junction 43. This adjustment will reduce the potential level of the sliding contact 61 on the speed control potentiometer 60 below that of the sliding contact 55 on the feedback potentiometer 53. Due to the blocking diode 56, no current will flow from the feedback potentiometer 53 to the speed control potentiometer 60. The error detector 57 will reflect that condition to the control signal source 33, causing the latter to turn off the thyratrons 4 and 5 terminating the flow of motor drive current to the output terminals 18 and 28 of the controlled power source. If there were no dynamic braking circuit, the motor would be left to coast until it had been decelerated by its load and internal friction to the desired lower speed, because the power supply is nonregenerative. Where inertia is large as compared to friction, permitting the motor to coast to a lower speed may be intolerably time consuming. Hence, some sort of braking means is required in many applications to decelerate the motor more rapidly.

Dynamic braking hastens this deceleration. When current ceases to flow between the output terminals 18 and 28 of the controlled power source, the coil 34 of the underload relay 35 is deenergized permitting the normally open contacts 36 of the relay 35 to open, thereby deenergizing the braking relay 46 permitting normally closed contacts 45 to close, and complete the dynamic braking circuit. The rotating armature 1, driven now only by inertia, will continue to generate an E.M.F. of polarity opposite that of motor drive current, and when the braking circuit is completed this generated E.M.F. results in a braking current flowing from the armature 1 through the closed contacts 45 and the drop resistor 49, to the armature 1. The potential drop across the drop resistor 49 will impose a deceleration signal proportional to the braking current across the current limiting resistor 50 and the IR compensation resistor 41 such that the compensation junction 52, and hence the sliding contact 42 on the IR compensation potentiometer 41 will be at a higher or more positive potential that the reference junction 43. Since the sliding contact 42 is adjusted so that the potential drop from it to the reference junction 43 is proportional to the IR loss in the armature 1, the potential level of the sliding contact 55 on the feedback potentiometer 53 will be raised by an amount proportional to the IR loss of the armature 1. Therefore, the potential level of the sliding contact 55 on the feedback potentiometer 53 relative to the reference junction 43 will be accurately proportional to the E.M.F. generated in the armature 1. As a result, the feedback signal generated during deceleration or braking will accurately reflect motor speed.

Then, during both motoring and braking operation the potential level of the slider 55 on the feedback potentiometer 53, as seen by the error detector 57, will be accurately proportional to the speed of the motor. This result could be achieved in limited circumstances by connecting the IR compensation potentiometer 41 so that both the motoring current and the braking current would pass directly through the IR compensation resistor 41, as is shown by the prior art. However, in such a connection, the total resistance of the braking circuit could be no less than the total resistance of the IR compensation potentiometer 41, which would be determined by the characteristics of the specific motor. Since the braking force supplied by a dynamic braking circuit varies with the amount of braking current flowing in the circuit, the braking force possible in a prior art arrangement is limited by the amount of IR compensation impedance required. If greater dynamic braking is needed, a different, more expensive and complex motor control system was used prior to the present invention.

The present invention achieves the result of accurate compensation for IR losses in the motor during both motoring and braking, and in addition it avoids the limitations of the prior art by providing a low resistance path for the braking currents through the drop resistor 49 of the braking transducer 48, by-passing the IR compensation potentiometer 41, which is in parallel with the main armature current path. The current limiting resistors 39 and 50, which prevent the flow of any significant portion of the braking current through the IR compensation potentiometer 41, combine with the drop resistors 38 and 49, respectively, to sense the flow of current in the armature 1 and to impose a signal proportional to the current in the armature 1 across the IR compensation potentiometer 41.

The values of the resistors in the braking transducer 48 and the motoring transducer 40 as well as the value of the IR compensation potentiometer 41 may be varied to suit the requirements of the application. However, for the operation of the control system shown in FIG. 1 the current limiting resistor 39 in the motoring transducer 40 should be of equal value to the current limiting resistor 50 in the braking transducer 48, and the drop resistor 38 in the motoring transducer 40 should be of size equal to the drop resistor 49 in the braking transducer 48, so that the voltage drop across the IR compensation potentiometer 41 during motoring or braking, for any given speed will always be the same.

The second embodiment of the present invention, shown in FIG. 2, has many of the same elements as the circuit of the first embodiment already described, and the reference numerals used for the identical elements are the same for both embodiments. The following discussion will not be burdened with a repeated description of those elements common to both embodiments, but will be confined to the circuitry and components unique to the second embodiment, to wit: transducers 62 and 63.

The braking transducer 62, of the second embodiment, is a direct current transformer which has a saturable reactor 65 with a control winding 64 connected in the braking circuit in series with the armature 1 and the dynamic braking resistor 44, and main winding 66. The main winding 66 is connected in series with an alternating current source in the form of a secondary 67 of a transformer 68 which has its primary 69 connected across the alternating current input terminals 2 and 3 of the power supply. In series with both the secondary 67 and the main winding 66 are a pair of input terminals 70 and 71 of a bridge rectifier 72, which has its negative output terminal 73 connected to the reference junction 43 in common with one end of the IR compensation potentiometer 41, and its positive output terminal 74 connected through a current limiting resistor 75 to the compensation junction 52 at the other end of the IR compensation potentiometer 41.

The structure of the motoring transducer 63 parallels that of the braking transducer 62 in all respects. The motoring transducer 63 is a direct current transformer, including as its primary component a saturable reactor 76, which has a control winding 77 connected in series between the armature 1 and the negative output terminal 28 of the controllable power supply, and a main winding 78 connected across the input terminals 79 and 80 of a bridge rectifier 81. An alternating current source consisting of a secondary 82 of a transformer 83, having its primary connected across the alternating current input terminals 2 and 3 of the power supply, is connected in series with the main winding 78 and the bridge rectifier 81. The bridge rectifier 81 has its output terminals 85 and 86 connected across the IR compensation potentiometer 41 and a current limiting resistor 87, with the positive output terminal 85 connected to the reference junction 43 and the negative output terminal 86 connected through the current limiting resistor 87, to the compensation junction 52.

During motoring operation the motoring current in the armature 1 will pass through the control winding 77 of the direct current transformer of the motoring transducer 63. If the armature current is low, the core of the saturable reactor 76 will not be saturated and hence the saturable reactor 76 will present a large impedance limiting the amount of rectified current through the IR compensation potentiometer 41 to a correspondingly small value. On the other hand, if, as in a starting or rapid acceleration situation, the armature current is heavy, its presence in the control winding 77 may saturate the core of the reactor 76 so that the reactor 76 presents a reduced impedance with a resultingly large signal across the IR compensation potentiometer 41.

Hence, the motoring signal appearing across the IR compensation potentiometer 41 will always be proportional to the armature current flowing in the motoring circuit, and the sliding contact 42 will be at a lower potential than the reference junction 43 because the compensation junction 52 is connected to the negative output terminal 85 of the rectifier 81 and the reference junction 43 is connected to the positive terminal 86. Since the sliding contact 42 on the IR compensation potentiometer 41 is adjusted relative to the reference junction 43 to create a voltage drop proportional to the IR loss in the armature 1, the voltage drop from the sliding contact 55 on the feedback potentiometer 53 as compared to the junction 43 will be directly proportional to the back E.M.F. generated in the armature 1. Therefore, the potential of the sliding contact 55 will be proportional to motor speed during motoring operation.

The operation of the braking transducer 62 is, of course, closely similar to the operation of the motoring transducer just discussed, except that the braking signal imposed across the IR compensation potentiometer 41 will be of polarity opposite to that of the motoring signal. During motor deceleration, or braking, when the contacts 45 of the braking relay 46 are closed and no motoring current is flowing, braking current flows from the armature 1 through the contacts 45, the dynamic braking resistor 44, and the control windings 64 of the braking transducer 62, back to the armature 1. The larger the braking current is, the greater will be the magnetic field generated about the control winding 64 driving the saturable reactor 65 to saturation. As the reactor 65 approaches saturation, the impedance of the reactor 65 decreases and more current is delivered to the IR compensation potentiometer 41, so that the voltage drop across the IR compensation potentiometer 41 increases. It follows that the deceleration signal across the IR compensation potentiometer 41 is directly proportional to the current flowing in the braking circuit.

Since the output terminals 73 and 74 of the rectifier 72 in the braking transducer 62 are connected across the IR compensation potentiometer 41 in reverse polarity orientation from those of the motoring transducer 63, the compensation junction 52, during deceleration, will be raised to a higher potential level than the reference junction 43. Therefore, during deceleration the sliding contact 42 on the IR compensation potentiometer 41 will be at a higher potential than the reference point 43, and IR compensation voltage drop will be added to the E.M.F. generated across the armature 1, cancelling the effect of the IR loss within the armature 1. Therefore, the potential level of the sliding contact 55 on the feedback potentiometer 53, as seen by the detector 47, will be proportional to the E.M.F. generated in the armature 1 during the braking operation, and proportional to motor speed.

During either the motoring or braking operation of the second embodiment, the feedback signal, or the potential of the sliding contact 55 relative to the junction 43, will be proportional to motor speed, provided that the components of the motoring transducer 63 and the braking transducer 62 are so balanced that for an armature current of any given magnitude the output of the transducers 62 or 63 will be the same. In the second embodiment, like the first embodiment, the polarities of the motoring and braking signal, imposed across the IR compensation potentiometer will be such that the voltage drop from the sliding contact 42 of the IR compensation potentiometer 41 will reduce the potential level of the feedback signal during motoring and increase the potential of the feedback signal during braking by an amount proportional to the IR loss in the armature 1 so as to cancel the effect of that IR loss. The transducer 63 of the second embodiment may be generally distinguished over the transducers of the first embodiment in that the armature currents during motoring and braking in the second embodiment are not directly utilized to produce an output signal from the transducer 62 or 63, but instead an independent external power source provides the motoring and braking signals across the IR compensation potentiometer 41. In the first embodiment a portion of the armature currents during motoring and braking appear directly across the IR compensation potentiometer 41 as the motoring or braking signals, and no outside power source is utilized.

These distinctions lead to certain advantages for each embodiment in specific applications. Clearly the components of the first embodiment are simpler and less expensive than those of the second embodiment. On the other hand, the first embodiment would be disadvantageous with high power motors where large amounts of power would be dissipated in the various resistors. Hence, the second embodiment is particularly advantageous in application to high power motors, since substantially no power dissipation is involved in the transducers 62 and 63. Also, the transducers 62 and 63 of the second embodiment lend themselves much more readily to factory adaptations for a wide range of applications for the control system, since saturable reactors for D.C. transformers such as the transducers 62 and 63 are readily manufactured to satisfy almost any operating specifications.

In both embodiments the IR compensation resistor is outside the main armature current path, and need not conduct large currents. To detect armature current value current elements more suitable for conducting armature current are employed. In FIG. 1 these are the drop resistors 38 and 49 of the transducers 40 and 48, and in FIG. 2 they are the control windings 64 and 77 of the saturable reactors 65 and 76. The transducers, in both embodiments, then translate this detection of armature current to an appropriate voltage signal across the IR compensation resistor. In this manner of removing the IR compensation resistor from the armature current path a more versatile control is had than was previously available.

A further advantage of the present invention occurs in the smooth transition which takes place when the desired reduced motor speed is achieved and the system changes from braking operation to motoring operation. Depending on the sensitivity of the particular component used for the underload relay 34, there will be a greater or lesser period when a small amount of motoring current is flowing between the converter output terminals 18 and 28 and the braking circuit continues to be closed. During that period both braking and motoring signals will be imposed across the IR compensation potentiometer 41 by the transducers 40 and 48, or 62 and 63. However, the potential level of the compensation junction 52 will assume value midway between the magnitudes of the opposing braking and motoring signals, so that a smooth transition from braking to motoring operation will result.

The foregoing discussions speaks of a motor which functions as a generator during deceleration. The generic and proper term for a direct current machine is the word "dynamo," which encompasses both motor and generator operations. However, as used here, the three words, motor, generator and dynamo, are intended as interchangeable terms meaning any direct current machine, which when electrically energized functions as a motor, and which when mechanically driven functions as a generator.

The advantages set forth above may be achieved by the described embodiments of the present invention. However, variations in those embodiments may be devised, and other embodiments may be made, while utilizing the invention and enjoying its advantages. Since the invention, therefore, is not confined to the circuitry described, the following claims are added in conclusion to point out particularly and distinctly the subject matter of this invention.

We claim:

1. In a deceleration control for a dynamo having an armature in which an E.M.F. is generated during operation, the combination comprising:
   a dynamic braking circuit adapted for connection across an armature of said dynamo;
   an IR compensation impedance;
   a transducer including a portion of said dynamic braking circuit to sense a current flowing in said dynamic braking circuit and to impose a signal proportional to said current across said IR compensation impedance;
   and a feedback signal source connected to said IR compensation impedance and a terminal of said armature of said dynamo to receive a signal proportional to an E.M.F. generated in said armature of said dynamo.

2. In a deceleration control according to claim 1 wherein said transducer is comprised of a voltage divider network having a first resistor connected in series with said armature in said dynamic braking circuit, a second resistor connected in parallel with said first resistor and in series with said IR compensation impedance; and wherein said IR compensation impedance is connected to said armature in parallel with said first resistor and in series with said second resistor.

3. In a deceleration control according to claim 1 wherein said transducer is comprised of a direct current transformer having a saturable reactor with control windings connected in said dynamic braking circuit and main windings; an alternating current power source in series with said main windings; and a rectifier having input terminals in series with said main winding and said alternating current source, and output terminals connected across said IR compensation resistor.

4. In a feedback signal generator for a speed control of a dynamo driven by a controllable power source and having an armature in which an E.M.F. is generated during operation, the combination comprising:
   a dynamic braking circuit adapted for connection across an armature of said dynamo for deceleration of said dynamo;
   a motoring circuit adapted for connecting said armature of said dynamo in series with said controllable power source to drive said dynamo;
   an IR compensation impedance;
   a braking transducer including a portion of said dynamic braking circuit to sense a braking current in said braking circuit and to impose a deceleration signal across said IR compensation impedance proportional to said braking current;
   a motoring transducer including a portion of said motoring circuit to sense a motoring current in said motoring circuit and to impose a motoring signal of opposite polarity from said deceleration signal across said IR compensation impedance;
   and a feedback signal source connected between said IR compensation impedance and said armature of said dynamo to receive a feedback signal proportional to E.M.F. generated in said armature, and having an output means for transmitting said feedback signal for the control of said controllable power source.

5. A feedback signal generator according to claim 4 wherein
   said braking transducer is comprised of a voltage divider network having a braking drop resistor and a first current limiting resistor connected in series across said IR compensation impedance, said braking drop resistor being connected in series with said armature in said dynamic braking circuit;
   said motoring transducer is comprised of a voltage divider network having a motoring drop resistor and a second current limiting resistor connected in series across said IR compensation impedance, said motoring drop resistor being connected in series with said armature in said motoring circuit;
   and said braking drop resistor being of substantially equal resistance to said motoring drop resistor, and said first current limiting resistor being of substantially equal resistance to said second current limiting resistor.

6. A feedback signal generator according to claim 4 wherein
   said braking transducer comprises a direct current transformer having a saturable reactor with a control winding in series with said armature in said dynamic braking circuit and a main winding, an alternating current source in series with said main winding, and a rectifier with input terminals in series with said main winding and output terminals connected across said IR compensation impedance;

and said motoring transducer comprises a direct current transformer having a saturable reactor with a control winding in series with said armature in said motoring circuit and a main winding, an alternating current source in series with said main winding, and a rectifier in series with input terminals, said main winding and output terminals being connected across said IR compensation impedance in opposite polarity orientation from the output terminals of said rectifier in said braking transducer.

7. In a speed control for a direct current motor having an armature in which an E.M.F. is generated during operation and being driven by a controllable power supply, the combination comprising:

a motoring circuit connecting an armature of said motor to be energized by power from said controllable power supply;

a dynamic braking circuit connected across said armature and containing a current valve in series with said armature adapted to conduct current when said power supplied to said motoring circuit is less than a predetermined minimum;

an IR compensation impedance;

a braking transducer including a portion of said dynamic braking circuit to sense a braking current in said dynamic braking circuit and to impose a deceleration signal proportional to said braking current across said IR compensation impedance;

a motoring transducer including a portion of said motoring circuit to sense a motoring current in said motoring circuit and to impose a motor signal of opposite polarity from said deceleration signal across said IR compensation impedance;

a feedback signal source connected across said IR compensation resistor and said armature and having output means presenting a feedback signal proportional to an E.M.F. generated in said armature;

a reference signal source producing a reference signal proportional to a desired motor speed;

and an error detector connected to receive said feedback signal and said reference signal, and adapted to compare said feedback and reference signals and to transmit an appropriate command signal to control the output of said controllable power source.

8. In a control for a dynamo having an armature in which an E.M.F. is generated during operation, the combination comprising:

a dynamic braking circuit adapted for connection across said armature;

a motoring circuit adapted for connecting said armature to a source of power;

an IR compensation impedance;

a feedback signal source connected to said IR compensation impedance and adapted with said IR compensation impedance for connection across said armature;

a first armature current detection element in said braking circuit that establishes a first electrical signal indicative of armature current;

first circuit means between said first armature current detection element and said IR compensation impedance that imposes a deceleration signal upon said IR compensation impedance that is proportional to said first electrical signal indicative of armature current;

a second armature current detection element in said motoring circuit that establishes a second electrical signal indicative of armature current; and second circuit means between said second armature current detection element and said IR compensation impedance that imposes a motoring signal upon said IR compensation impedance that is proportional to said second electrical signal indicative of armature current.

9. A control as in claim 8 wherein said first and second armature current detection elements each comprise a drop resistor in its respective braking and motoring circuit that conducts armature current, and said first and second circuit means each comprise a current limiting resistor in series with said IR compensation resistor, each series connection of a current limiting resistor and the IR compensation resistor being in parallel with the drop resistor comprising the associated armature current detection element.

10. A control as in claim 8 wherein said first and second circuit means each comprise a source of alternating current, the main windings of a saturable reactor and a rectifier, each source of alternating current being connected through its associated saturable reactor main windings and rectifier to said IR compensation impedance; and wherein said first and second armature current detection elements each comprise a control winding for one of said saturable reactor main windings.

References Cited by the Examiner

UNITED STATES PATENTS

| | | | |
|---|---|---|---|
| 2,721,968 | 10/1955 | Brown | 318—269 |
| 2,955,244 | 10/1960 | Montross | 318—331 |
| 3,231,808 | 1/1966 | McDaniel | 318—331 |

BENJAMIN DOBECK, *Primary Examiner.*